Patented Oct. 28, 1930

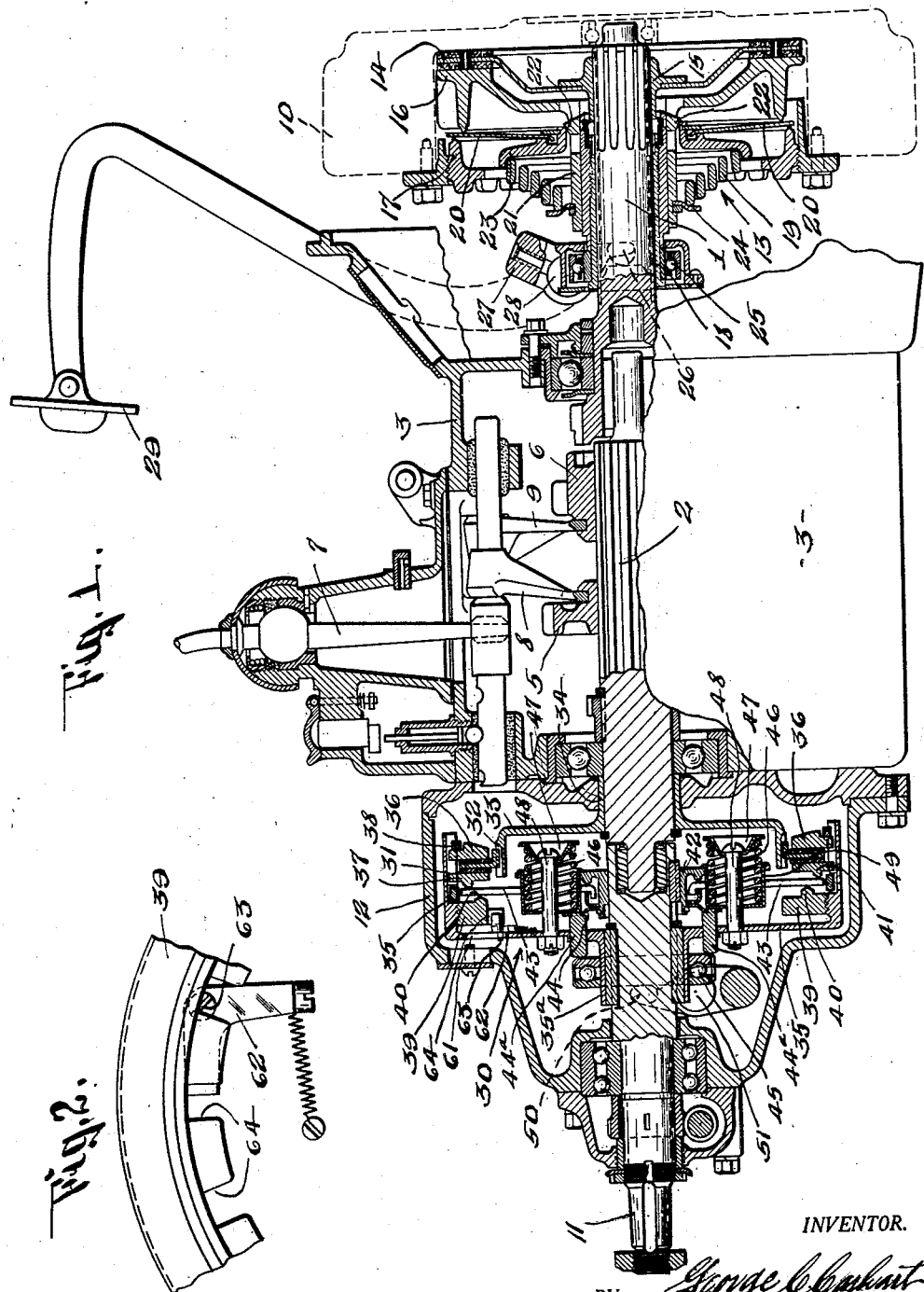

1,780,065

UNITED STATES PATENT OFFICE

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK

POWER-TRANSMITTING MECHANISM

Application filed March 17, 1926. Serial No. 95,448.

This invention relates to motion transmitting mechanisms such as are used in motor vehicles and has for its object a particularly simple and efficient means whereby the shafts, gears, clutch sections or other rotative parts of a transmission gearing are relieved of all braking forces and all driving forces either from the engine or from the propeller shaft of the vehicle during gear shifting operations and are also free of the centrifugal or fly wheel effect of rotatable parts connected to the driving and driven shafts of the gearing, that is, they are neither being rotated nor held from rotating by brakes during gear shifting operations.

The invention consists in the novel features and in the combinations and constructions hereinafter set forth and claimed.

In describing this invention, reference is had to the accompanying drawings in which like characters designate corresponding parts in all the views.

Figure 1 is a side elevation, partly in section, of a transmission mechanism embodying my invention.

Figure 2 is a fragmentary detail view of the lock for the fulcrum ring of the rear clutch.

This invention comprises generally a gear set or transmission gearing having the usual driving and driven shafts and the motion transmitting means between the shafts including the countershaft and gears, some of which are shiftable and one of which is combined with a direct drive jaw clutch, and means for shifting the gears, a front or main clutch connecting the prime mover or engine shaft and the driving shaft of the gearing, and an auxiliary or rear clutch connecting the driven shaft of the gearing and the propeller shaft driver, that is, the shaft is connected to the propeller shaft of the vehicle by a universal joint, both clutches particularly the auxiliary clutch including light sections rotatable with the driving and driven shafts of the gearing whereby the gearing is relieved of the centrifugal or fly wheel effect of heavy parts of the clutch when the clutches are disengaged.

1 and 2 designate respectively, the driving and driven shafts of the gearing which are journalled, respectively, in bearings in the front and rear walls of the transmission gear case 3, the shafts 1 and 2 being arranged in axial alinement and the shaft 2 having a pilot bearing in the rear end of the shaft 1.

5 and 6 are shiftable gears forming part of the motion transmitting mechanism within the gear box between the driving and driven shafts.

7 is a lever for selecting and shifting the gears 5, 6, this lever coacting with the usual slide rods having forks 8, 9 connected to the gears 5 and 6 respectively.

As the construction of this type of transmission gearing is well known, further description is thought to be unnecessary.

10 designates the prime mover or fly wheel of the engine and 11 the propeller shaft driver, the latter being mounted in an auxiliary casing 12 mounted on the rear wall of the gear case 3 and having a pilot bearing on the rear end of the driven shaft 2 of the gearing.

13 designates the main or front clutch as a whole, between the prime mover 10 and the driving shaft 1 of the gearing, this clutch including a comparatively light non-centrifugal member or section rotatable with the shaft 1 and the remaining heavy parts of the other section of the clutch being rotatable with the prime mover or fly wheel 10 so that the centrifugal or fly wheel effect of any part of the clutch rotating when the clutch 13 is disengaged is not effective on the shaft 1. In other words, the shaft 1 is relieved of the centrifugal effect of all heavy rotating parts which have a fly wheel effect.

The clutch here shown is of the single plate type in which the plate or light member is rotatable with the shaft 1.

14 designates the single plate rotatable with the shaft 1, it having its hub 15 splined thereto. The remainder of the clutch includes an axially shiftable pressure plate 16, an abutment ring 17, a throw-out sleeve 18, a main spring 19 and motion transmitting levers 20 between the throw-out sleeve and the pressure ring, these levers fulcruming on the fulcrum ring and also thrusting against an annular bearing face on the pressure ring.

All of these parts 16, 17, 18, 19 and 20 are rotatable with the fly wheel 10 and most of this mechanism is located in a recess in the rear face of the fly wheel as will be understood by those skilled in the art.

The single plate 14 has its margin provided with friction facing disks located between the pressure ring 16 and the bottom surface of the recess in the fly wheel, all as will be understood by those skilled in the art.

The throw-out sleeve 18 is here shown as mounted within a hub 21 on the pressure ring and as slidable axially thereof, and as having radially extending shoulders 22 extending through slots in the hub 21 and coacting with the spring abutment 23. The spring abutment acts on the levers 20. The rear end of the spring acts against the abutment 24 on the rear end of the hub 21 on the pressure ring.

The throw-out sleeve has a throw-out bearing 25 at its rear end with which coacts the fork arms 26 of a yoke 27 mounted on a shaft 28, which in turn is mounted in the clutch casing, the shaft 28 extending to the outside of the clutch casing and having the usual clutch pedal 29 thereon. The construction of the clutch per se, forms no part of this invention and it is pertinent only in so far as a light non-centrifugal member of the clutch is mounted on the shaft 1 while all the other heavier parts are rotatable with the fly wheel so that when the clutch is disengaged there is no fly wheel momentum applied to the gearing.

The auxiliary clutch also comprises a non-centrifugal member rotatable with the driven shaft 2 of the gearing and the section carrying the remainder of the parts of the clutch is rotatable with the propeller shaft driver so that when the auxiliary clutch is disengaged, the gearing is relieved of all centrifugal or fly wheel effect due to heavy rotating parts connected to the driven shaft of the gearing, and hence the gears quickly come to a stop as there is no momentum tending to turn them and no braking action is necessary to stop them, and therefore, the gears are free to adjust themselves without any restraining force on them during gear shifting operations.

30 designates the rear clutch as a whole located in the casing 12.

31 is the single plate member of the clutch, this being a flat ring with friction facings on opposite sides thereof, this ring being carried by and keyed at 32 to a drum 33 rotatable with the driven shaft 2 having a hub 34 mounted thereon, the drum being located in the casing 12. The remainder of the clutch or the section of the clutch associated with the propeller shaft driver 11, comprises an outer drum 35 having a hub 35ª keyed to the shaft 11 to rotate therewith, the drum having a fixed abutment 36 on the front side of the single plate 31, and a pressure ring 37 on the rear side of said plate, the ring being shiftable axially. The abutment 36 thrusts against a lock ring 38. Both the abutment and the ring are interlocked with the drum 35 to rotate therewith. Also an adjustable fulcrum ring 39 threads into the drum and is opposed to the pressure ring 37, the fulcrum having an annular fulcrum surface 40. The pressure ring also has an annular bearing surface 41.

42 is a throw-out collar slidable on the shaft 11.

43 is a series of outwardly extending levers bearing at their outer ends against the annular fulcrum surface 41 of the pressure ring fulcruming near their outer ends on the annular fulcrum surface 40 and coacting at their inner ends with the throw-out collar 42. The throw-out collar also has an annular abutment 44 thereon formed with studs 44ª extending through the web or rear wall of the drum 35 in position to be acted upon by the throw-out bearing 45 which slides on the hub 35ª of the drum.

Clutch springs 46 are interposed between the throw-out collar 42 and abutments 47 connected to the web of the drum 35 by tie bolts 48, these springs thrusting at like ends against the abutments 47 and at their other ends against the bottoms of sockets 49 secured to the throw-out collar 42.

Obviously, during movement of the throw-out bearing 45 forwardly or to the right, the throw-out collar 42 will be moved to the right through the studs 44ª and thus compress the springs and also move the levers away from their fulcrum surfaces 40 thus releasing the clutch.

Movement of the throw-out bearing 45 to the left will permit the springs to move the throw-out bearing 42 to the left thus causing the levers to fulcrum on said fulcrum surface 40 and apply pressure to the pressure ring and thus engage the clutch.

The throw-out bearing 45 is actuated by a fork 50 suitably mounted on a rock shaft 51 mounted in the case 12. The rock shaft 51 is actuated in any suitable manner from the front pedal 29 or the shaft 28 on which it is mounted.

The fulcrum ring 39 is adjustable through a work hole 61 for a screw driver or other tool in the web of the drum 35. The ring 39 is normally held in its adjusted position by a spring pressed pawl 62 pivoted at 63 to the inner side of the web of the drum 35 and coacting with notches 64 in the ring. The pawl is so located that it can be readily disengaged from the notch 64 by the tool which is being inserted through the work hole 61 to turn the ring 39.

In operation, owing to the single plate clutches, the single plate sections of which rotate with the driving and driven shafts of the gearing, no fly-wheel momentum is effective on the transmission gearing either from the front end or the rear end after the clutches are disengaged and the gears of the gearing come to a stop without the use of brakes which would retard their adjusting themselves to other gears while being brought into mesh.

The usual brake may be used in connection with the front clutch to retard the rotation of the driven member of the clutch after the clutch is disengaged preliminary to gear shifting operation.

What I claim is:

In a transmission mechanism, the combination of the driven shaft of a transmission gearing, a second shaft, a clutch connecting the shafts, whereby the second shaft is normally driven from the first shaft, the clutch including sections rotatable respectively with the shafts and the section rotatable with the first shaft comprising an axially movable single plate and the other section comprising a drum mounted on the second shaft and enclosing the single plate, a fixed abutment carried by the drum on the front side of the single plate, a pressure ring carried by the drum on the rear side of the single plate, spring means associated with the clutch section on the second shaft for pressing the pressure ring and the single plate against the fixed abutment and throw-out means for operating the shiftable section against the action of the spring means to declutch the sections.

In testimony whereof, I have hereunto signed by name at Syracuse, in the county of Onondaga, and State of New York, this 26th day of February, 1926.

GEORGE C. CARHART.